United States Patent [19]

Watanabe et al.

[11] Patent Number: 4,717,642

[45] Date of Patent: Jan. 5, 1988

[54] PROCESS FOR IMPROVING ADHESION BETWEEN PHOTOGRAPHIC LAYERS

[75] Inventors: Toshihiro Watanabe; Hideki Tomiyama, both of Kanagawa, Japan

[73] Assignee: Fuji Photo Film Co., Ltd., Kanagawa, Japan

[21] Appl. No.: 855,563

[22] Filed: Apr. 25, 1986

[30] Foreign Application Priority Data

Apr. 25, 1985 [JP] Japan .................................. 60-89493

[51] Int. Cl.⁴ .......................... G03C 1/30; G03C 1/74; B05D 3/04; B32B 27/00

[52] U.S. Cl. .................................... 430/213; 430/215; 430/216; 430/523; 430/531; 430/536; 430/539; 430/621; 430/935; 430/954; 156/325; 427/333; 428/423.1; 428/424.2; 428/425.1

[58] Field of Search ............... 430/215, 935, 954, 621, 430/216, 213, 523, 536, 331, 539; 427/333; 156/325; 428/423.1, 424.2, 425.1

[56] References Cited

U.S. PATENT DOCUMENTS 4,281,060 7/1981 Usami et al. ........................ 430/954
4,296,195 10/1981 Bishop et al. ........................ 430/215
4,297,432 10/1981 Bowman et al. ..................... 430/215
4,298,682 11/1981 Bishop ................................ 430/215

*Primary Examiner*—Richard L. Schilling
*Attorney, Agent, or Firm*—Sughrue, Mion, Zinn, Macpeak & Seas

[57] ABSTRACT

A process for improving adhesion between photographic layers of a photographic element comprising a support having provided thereon at least (1) a first photographic layer comprising a high molecular weight compound having a functional group capable of reacting with an isocyanate group and (2) a second photographic layer comprising a high molecular weight compound having a functional group capable of reacting with an isocyanate group which compound is different from the high molecular weight compound of said first layer, which process comprises coating from 2 to 20 ml/$m^2$ of a solution containing a polyisocyanate compound having at least two isocyanate groups on the first photographic layer, drying said solution, and then coating the second photographic layer.

11 Claims, 1 Drawing Figure

PROCESS FOR IMPROVING ADHESION BETWEEN PHOTOGRAPHIC LAYERS

FIELD OF THE INVENTION

This invention relates to a process for improving adhesion between photographic layers, and more particularly, to a process for improving film strength of a multi-layer coating film in a diffusion transfer photographic process.

BACKGROUND OF THE INVENTION

In instant photography, an image is formed by development processing with an alkaline processing solution within a film unit and, after the elapse of a prescribed time, the alkaline processing solution is neutralized to stop development and stabilize the image. The neutralization mechanism is usually composed of a neutralizing layer and a neutralization timing layer and mostly provided in a cover sheet in cases of monosheet type instant light-sensitive materials or in an image-receiving sheet in cases of peel-apart type instant light-sensitive materials. The neutralizing layer and the neutralization timing layer are formed adjacent to each other, and a hydrophilic organic colloidal layer (image-receiving layer) is further provided adjacent to the neutralization timing layer in the case where the neutralization mechanism is provided in an image-receiving sheet. In many cases, each of these layers differs in material from each other so that the conventional multi-layer neutralization elements show poor adhesion between layers in a dry state or wet state. This poor adhesion causes various unfavorable disorders before, during and after processing, such that the above-described layers are separated at the time of finishing instant film units; and peel-apart type instant materials suffer separation between these layers upon peeling of a light-sensitive element and an image-receiving element after development processing, which results in a part of the light-sensitive element remaining on the image-receiving element, or a part of the image-receiving element remaining on the light-sensitive element. Further, when an adhesive tape, e.g., Cello-Tape, is once attached to an image-receiving element of the peel-apart type instant film after having been processed to fix it on a mount of an album or a wall and then removed therefrom, the surface layer of the image-receiving element is separated off together with the adhesive tape to cause disappearance of a part or the whole of an image. Furthermore, when water attached on a processed image-receiving element is wiped away, the layers are separated, and loose a part or the whole of an image.

In order to improve such poor adhesion between layers, it has been proposed to interpose a primer layer between layers having poor adhesion, as disclosed in U.S. Pat. Nos. 4,297,432 and 4,297,195, European Pat. Nos. 46,692A2, 45,693A2, and 45,694A2 and U.S. Pat. No. 4,298,682, etc. However, since the proposed primer layer comprises a mixture of two or more copolymers having relatively complicated structures, preparation of these materials is complicated and also entails high cost.

SUMMARY OF THE INVENTION

Accordingly, an object of this invention is to provide a simple and economical process for improving adhesion between photographic layers, by which separation of layers due to poor adhesion can be prevented without adversely affecting photographic performances.

The present invention relates to a process for improving adhesion between photographic layers comprising coating (1) a first photographic layer comprising a high molecular weight compound having a functional group capable of reacting with an isocyanate group, and (2) a second photographic layer comprising a different high molecular weight compound having a functional group capable of reacting with an isocyanate group on a support, wherein a solution containing a polyisocyanate compound having at least two isocyanate groups is coated on the first photographic layer in an amount of from 2 to 20 ml/m$^2$, followed by drying, and said second photographic layer is then coated thereon.

BRIEF DESCRIPTION OF THE ACCOMPANYING DRAWING

FIG. 1 is a schematic view illustrating coating and drying steps useful for carrying out the present invention.

DETAILED DESCRIPTION OF THE INVENTION

Figure 1:
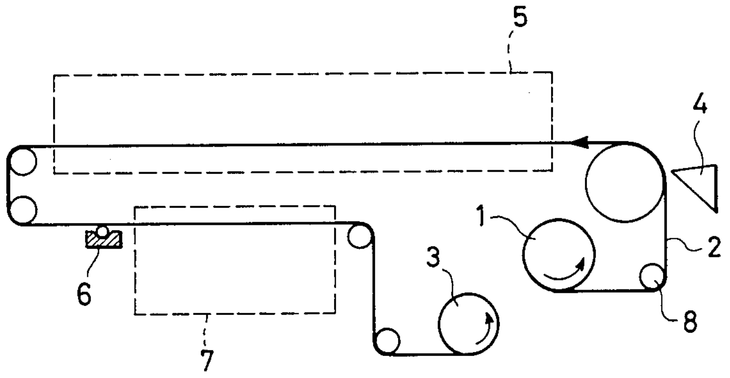

The present inventors conducted extensive investigations and, as a result, found that the adhesive strength between layers in dry or wet state can be markedly incresed by coating a difunctional or polyfunctional isocyanate compound (hereinafter referred to as polyisocyanate) between layers otherwise showing poor adhesion, thus preventing the above-mentioned disadvantages attributed to layer separation.

Nevertheless, polyisocyanates tend to act on not only the surface but also on the inside of each layer because of their high activity, resulting in significantly altering the functions of the affected layers. For example, in the case where the isocyanate compound is added directly to a coating solution of a neutralization timing layer, functional groups inside of the layer react with the polyisocyanate and, as a result, a neutralization timing period is extended to adversely affecting photographic properties. Such a problem also arises in the case where the polyisocyanate is independently coated on a timing layer without being incorporated in a coating solution. That is, if the amount of the solution to be coated, i.e., the amount of a solvent, is large, the polyisocyanate penetrates into the lower layer together with the solvent by the time that the coating solution is dried, whereby a reaction takes place deep in the timing layer, thus changing the timing performance.

The present inventors have conducted further investigations in order to improve adhesion between photographic layers without changing the photographic performance of a layer on which a polyisocyanate is coated. As a result, it has now been found that such an aim can be realized by using a polyisocyanate coating solution in a reduced amount, specifically in an amount of from 2 to 20 ml/m$^2$, to shorten the time required for drying to thereby lessen penetration of the isocyanate compound and the solvent into a lower layer.

A photographic element comprising a support having coated thereon the first photographic layer and the second photographic layer includes, for example, an image-receiving sheet, a light-sensitive sheet (the image-receiving layer and the light-sensitive layer may be laminated on the same support) and a cover sheet.

Combinations of the first and second photographic layers include a combination of a neutralizing layer and a neutralization timing layer and a combination of a first timing layer and a second neutralization timing layer. These layers may be present in any of the aforesaid photographic elements. Another example is a combination of a neutralization timing layer and an image-receiving layer.

In any of these layer combinations, it is necessary for application of the process of this invention that the first and second photographic layers each contains a cometc.; those having a plural kinds of functional groups, e.g., gelatin, etc.; and the like.

The polyisocyanate which can be used in the present invention may be any of aliphatic isocyanates, aromatic isocyanates and mixtures thereof. The upper limit of the number of isocyanate groups per molecule is not essentially limited. Specific but non-limiting examples of polyisocyanates which can preferably be used in the present invention are shown below.

$OCN\text{-}(CH_2)_6\text{-}NCO$

Compound 1

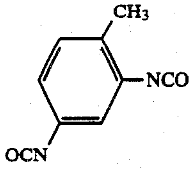

Compound 2

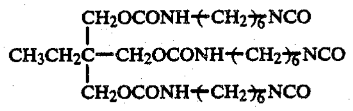

Compound 3

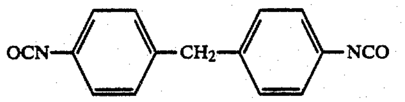

Compound 4

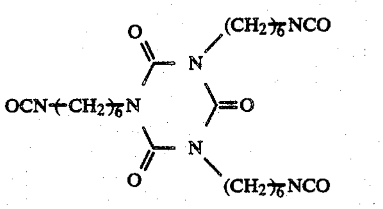

Compound 5

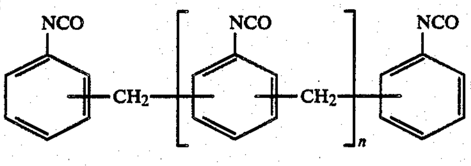

Compound 6 n = 0~2

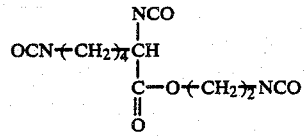

Compound 7

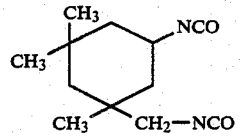

Compound 8

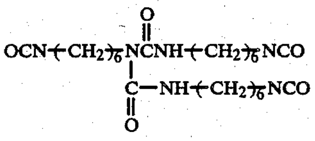

Compound 9

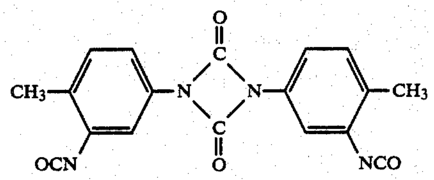

Compound 10

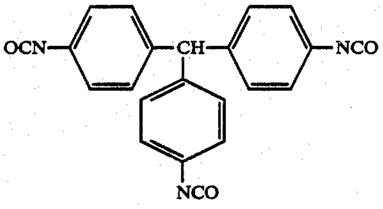

Compound 11

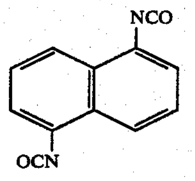

Compound 12

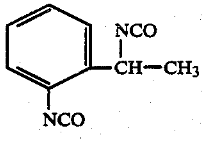

Compound 13 pound having a functional group reactive to an isocyanate group, such as a hydroxyl group, a carboxyl group, an amino group, etc. Examples of such a compound include those having a carboxyl group, e.g., polyacrylic acid, a styrene-maleic anhydride copolymer, etc.; those having a hydroxyl group, e.g., cellulose acetate, polyvinyl alcohol, hydroxyethyl cellulose, etc.; those having an amino group, e.g., polyethyleneimine, poly-L-lysine, These polyisocyanates may be used either alone or in combinations of two or more thereof.

The total amount of the polyisocyanates needed for manifestation of the effect to heighten adhesive strength between layer preferably ranges from 0.001 to 1.0 g/m$^2$, and more preferably is from 0.01 to 0.4 g/m$^2$.

For the purpose of accelerating the reaction of the isocyanate groups, a tertiary amine, such as triethylamine, diazabicyclooctane, triethanolamine, N-methylmorpholine, etc., or a metal salt, such as dibutyltin laurate, cobalt octenoate, lead octenoate, tin octanoate, zinc octanoate, etc., may be added preferably in an amount of from about 0.1 to 7 mol% based on the amount of polyisocyanate.

It is essentially important to provide a coverage of the polyisocyanate solution within the specified range in order to shorten the drying time. In addition, it is desirable to increase a quantity of drying air (but only to such an extent as not to cause uneven drying) and to increase a drying temperature (but only to such an extent as not to cause deformation of a support).

It is necessary that the application of a polyisocyanate solution be effected after the coating and drying of the lower layer on which the polyisocyanate solution is to be coated, for example, a neutralizing layer. For example, in the case of coating on a continuously running web, the web having coated thereon a first photographic layer (lower) is dried, and may be rolled up. Thereafter, the web can be unrolled and coated with a polyisocyanate solution for improvement of adhesion, followed by drying. The coating followed by drying of the polyisocyanate solution may continuously be carried out after the coating and drying of the lower layer.

The method of coating the polyisocyanate solution is not particularly restricted and includes gravure coating, bar coating, extrusion hopper coating, slide hopper coating, and the like.

The present invention can be carried out in accordance with the steps schematically shown in the accompanying drawing. In FIG. 1, web 2 is coated with a lower layer coating solution by coater 4 and, after being dried in drying zone 5, coated with a polyisocyanate solution by coater 6. The polyisocyanate layer is dried in drying zone 7 and rolled by winder 3. Then, the web is again delivered from delivery roll 1 and coated with an upper layer coating solution through the same steps as in the coating of the lower layer. In the coating of the upper layer, steps 6 and 7 may be omitted.

Solvents for the polyisocyanate may be any of organic solvents that are inert to an isocyanate group and highly capable of dissolving the polyisocyanate, such as aliphatic or aromatic hydrocarbons, ketones, ethers, esters, and the like, e.g., acetone, methyl ethyl ketone, benzene, toluene, tetrahydrofuran, dichloromethane, ethyl acetate, etc.

The process of this invention can be applied to photographic elements for silver salt or dye (inclusive of precursors thereof) diffusion transfer processes or to heat developable color photographic process, and preferably to film units composed of an image-receiving sheet comprising a support having provided thereon at least a neutralizing layer, a neutralization timing layer and an image-receiving layer and a light-sensitive sheet comprising another support having provided thereon at least a light-sensitive layer. The above-described film unit may be either of the monosheet type in which the light-sensitive sheet and the image-receiving sheet are integrated in one body throughout the exposure, development and appreciation of a transferred image as described, e.g., in U.S. Pat. No. 3,415,644, or of the peel-apart type in which an exposed light-sensitive sheet is brought into contact with an image-receiving sheet with their coating layers facing to each other and the image-receiving layer or a part thereof is stripped from the light-sensitive sheet after development as described, e.g., in U.S. Pat. No. 2,983,606. Another preferred film unit to which the present invention is applicable is composed of a light-sensitive sheet comprising a support having laminated thereon an image-receiving layer and a light-sensitive layer and a cover sheet. This film unit may be either of the monosheet type in which both sheets are integrated in one body throughout the exposure, development and appreciation of a transferred image as described in British Pat. No. 1,330,524, or of the type in which a portion including the image-receiving layer is stripped from the remainder after development as described, e.g., in Japanese Patent Application (OPI) No. 67840/81 (the term "OPI" herein used means "published unexamined Japanese patent application").

A very preferred film unit to which the present invention is applicable comprises a unit of a light-sensitive sheet and an image-receiving sheet and a rupturable container containing a processing solution that is provided between the light-sensitive sheet and the image-receiving sheet, in which the unit is passed through a pair of parallel pressing elements when it is removed from the camera to rupture the container thereby spreading the processing solution between the light-sensitive sheet and the image-receiving sheet and, after developing the exposed silver halide, the image-receiving sheet is peeled from the light-sensitive sheet.

The support for the photographic element which can be used in the present invention may be transparent or opaque and is preferably free from noticeable dimensional changes during processing. Such a support is commonly employed in photographic light-sensitive materials, and includes plastic films, such as films of cellulose acetate, cellulose acetate butyrate, polyethylene terephthalate, polystyrene, polypropylene, etc., or laminates thereof, synthetic paper, baryta paper, and resin-coated paper coated on both sides thereof with an α-olefin polymer, e.g., polyethylene. Of these supports, polyolefin-coated paper is preferred because of its low cost for production.

An image-receiving layer is generally provided on the polyolefin-coated paper support. In this case, since the coating and drying of the image-receiving layer necessitates heat resistance of the support, the polyolefin resin to be used preferably includes polypropylene, a blend of polypropylene and polyethylene, high density polyethylene, and a blend of high density polyethylene and low density polyethylene. In view of cost and laminating suitability, a blend of high density polyethylene and low density polyethylene is particularly preferred. A blending ratio preferably ranges from 1/9 to 9/1, more preferably from 2/8 to 8/2, and most preferably from 3/7 to 7/3, by weight. The molecular weight of the polyethylene is not particularly limited, but a melt index of high or low density polyethylene desirably falls within a range of from 1.0 to 40 g/10 min for assured extrudability.

Examples of white pigments that can be used in the polyolefin resin coating are titanium oxide, barium sulfate, calcium sulfate, barium carbonate, calcium carbonate, lithopone, alumina white, zinc oxide, silica, antimony trioxide, titanium phosphate, etc. and mixtures thereof.

Among these white pigments, titanium dioxide (rutile and/or anatase) is preferred because of its high hiding power. Titanium dioxide may be prepared by a sulfuric acid method or a chlorine method. Furthermore, the titanium dioxide to be used can be subjected to surface treatment with inorganic substances, e.g., hydrated alumina and/or hydrated silicon dioxide; organic substances, e.g., trimethylolmethane, trimethylolethane, trimethylolpropane, 2,4-dihydroxy-2-methylpentane, etc.; or siloxanes, e.g. polydimethylsiloxane, etc. The titanium dioxide is preferably used in an amount of from 10 to 20% by weight based on the weight of the polyolefin, in view of its hinding power.

The thickness of the polyolefin coating is generally from about 15 to 100 μm, and preferably from 25 to 50 μm. If desired, the polyolefin coating can contain coloring dyes, fluorescent brightening agents, and the like.

Base papers which can be used in the present invention include paper made of natural pulp, paper made of synthetic pulp, e.g., polyethylene, polypropylene, etc., paper prepared from mixed stock of natural pulp and synthetic pulp, paper prepared by combination of natural and synthetic pulp, and the like. Since the polyolefin-coated paper to be used as a support in the present invention is required to have excellent surface smoothness, base paper made of pulp fibers having the fiber length distribution as described in Japanese Patent Application (OPI) No. 68037/83 is used to advantage.

The base paper to be used preferably has a basis weight of from about 50 to 250 g/$m^2$, and more preferably from about 100 to 180 g/$m^2$; a thickness of from about 50 to 250 μm, and more preferably from about 100 to 180 μm; and a water content of from 5 to 9% by weight, and preferably from 6 to 7.5% by weight. The base paper is preferably subjected to calendering so as to have a smoother surface.

In order to make it possible to conduct development processing under daylight, the support can be laminated with polyethylene containing a light screen, e.g., carbon black, or coated with a dispersion of such a light screen in a water-soluble polymer, e.g., gelatin, polyvinyl alcohol, etc. The amount of the light screen to be used can be determined depending on sensitivity of the light-sensitive material.

The neutralizing layer, one of the photographic layers to which the present invention is applied, preferably comprises a film-forming acidic polymer. Examples of such a polymer are a monobutyl ester of a maleic anhydride/ethylene copolymer, a monobutyl ester of a maleic anhydride/methyl vinyl ether copolymer, a monoethyl ester, monopropyl ester, monopentyl ester or monohexyl ester of a maleic anhydride/ethylene copolymer, a monoethyl ester, monopropyl ester, monobenzyl ester or monohexyl ester of a maleic anhydride/methyl vinyl ether copolymer, polyacrylic acid, polymethacrylic acid, acrylic acid/methacrylic acid copolymers having various comonomer ratios, copolymers of acrylic acid or methacrylic acid and other vinyl monomers, e.g., acrylic esters, methacrylic esters, vinyl ethers, acrylamide, methacrylamide, etc., having various comonomer ratios, and preferably containing from 50 to 90 mol% of acrylic acid or methacrylic acid, and the like. The preferred among them are polyacrylic acid and an acrylic acid/butyl acrylate copolymer. Detailed description regarding neutralizing layers are described in U.S. Pat. Nos. 3,362,819, 3,765,885, and 3,819,371, French Pat. No. 2,290,699, etc.

The neutralization timing layer that can be used in combination with the neutralizing layer mainly comprises, for example, gelatin, polyvinyl alcohol, polyacrylamide, partially hydrolyzed polyvinyl acetate, a β-hydroxyethyl methacrylate/ethyl acrylate copolymer, acetyl cellulose, etc. The high polymers described in U.S. Pat. Nos. 3,455,686, 3,421,893, 3,785,815, 3,847,615, 4,009,030 and 4,123,275, etc. may also be employed. Further, the above-described neutralization timing layer may be combined with a polymer layer exhibiting a highly temperature-development permeability to an alkaline processing solution as described, e.g., in U.S. Pat. Nos. 4,056,394, 4,061,496, 4,199,362, 4,250,243, etc.

Additional high-molecular weight compounds that can be used for the neutralization timing layer are polymerization products of monomers susceptible to β-release in an alkaline environment. Examples of such polymerization products are described, e.g., in U.S. Pat. Nos. 4,551,410, 4,379,829, 4,407,983, 4,297,431, 4,288,523, 4,201,587 and 4,229,516, Japanese Patent Application (OPI) Nos. 121438/80, 141644/82 and 173834/82, West German Patent Application (OLS) No. 2,910,271, European Patent Application No. EP31957A1, *Research Disclosure*, RD No. 18452, August, 1979, etc.

When the present invention is applied to photographic elements according to dye diffusion transfer photography or heat developable color photography, the image-receiving layer is preferably a hydrophilic colloidal layer, typically gelatin, containing a polymer mordant.

The polymer mordant to be used includes polymers containing a secondary or tertiary amino group, a nitrogen-containing heterocyclic moiety, or a quaternary cation group thereof and has a molecular weight of from 5,000 to 200,000, and preferably from 10,000 to 50,000. More specifically, the polymer mordants which can be used include vinylpyridine polymers and vinylpyridinium cation polymers disclosed in U.S. Pat. Nos. 2,548,564, 2,484,430, 3,148,061 and 3,756,814, etc.; imidazole type polymers disclosed in Japanese Patent Application (OPI) Nos. 48210/80 and 129346/80, U.S. Pat. Nos. 4,282,305, 4,273,853, 4,193,796, 4,228,257 and 4,229,515, etc.; polymer mordants crosslinkable with gelatin, etc. as disclosed in U.S. Pat. Nos. 3,625,694, 3,859,096 and 4,128,538, British Pat. No. 1,277,453, etc.; latex type mordants or aqueous soluble type mordants as disclosed in U.S. Pat. Nos. 3,958,995, 3,721,852 and 2,789,063, Japanese Patent Application (OPI) Nos. 115228/79, 145529/79 and 126027/79, Japanese Patent Application (OPI) No. 232340/84, etc.; water-insoluble mordants as disclosed in U.S. Pat. No. 3,898,088; reactive mordants capable of covalently bonding with dyes as disclosed in U.S. Pat. No. 4,168,976 (corresponding to Japanese Patent Application (OPI) No. 137333/79); and the mordants disclosed in U.S. Pat. Nos. 3,709,690, 3,788,855, 3,642,482, 3,488,706, 3,557,066, 3,271,147, 3,271,148, 4,131,469, 4,154,615 and 4,142,899, Japanese Patent Application (OPI) Nos. 71332/75 and 155528/77. In addition, the mordants described in U.S. Pat. Nos. 2,675,316 and 2,882,156 may also be employed.

Among these mordants, those which hardly migrate from a mordanting layer to other layers, such as those crosslinkable with a matrix, e.g., gelatin, water-insoluble mordants and latex dispersion (or aqueous soluble) type mordants, are preferred.

Compounds capable of donating a diffusible dye or a precursor thereof to the aforesaid mordanting layer are employed in combination with silver halide emulsions. Such compounds may be any of those which are capable of imagewise releasing or forming a diffusible dye or a precursor thereof as a result of development, and include, for example, dye developers which become diffusible in an alkaline solution, non-diffusion couplers capable of releasing a diffusible dye upon coupling, dye-releasing redox compounds capable of releasing a dye upon redox reaction, and the like. The dye-releasing redox compounds may be either negative working or positive working.

The dye-releasing redox compounds that can be used in the present invention are represented by the formula

Y—D wherein D represents a dye or a precursor thereof; Y represents a group capable of imagewise releasing a diffusible dye or a precursor thereof upon development; and D and Y may be bonded via an appropriate linking group.

Typical examples of the diffusible dyes as represented by D are azo dyes of cyan, magenta or yellow color.

Specific examples of groups capable of imagewise releasing a diffusible dye or precursor thereof (indicated by Y above) are described in U.S. Pat. Nos. 3,928,312, 3,993,638, 4,076,529, 4,152,153, 4,055,428, 4,053,312, 4,198,235, 4,179,291, 4,149,892, 3,844,785, 3,443,943, 3,751,406, 3,443,939, 3,443,940, 3,682,952, 3,980,479, 4,183,753, 4,142,891, 4,278,750, 4,139,379, 4,218,368, 3,421,964, 4,199,355, 4,199,354, 4,273,855, 4,358,532, 4,371,604, 4,047,929, 4,135,929, 4,336,322 and 4,139,389, Japanese Patent Application (OPI) Nos. 50736/78, 12642/81, 4043/82, 650/82, 69033/78 and 130927/79, etc.

Negatively working dye-releasing redox compounds preferably include those wherein Y is an N-substituted sulfamoyl group, in which the N-substituent is an aromatic hydrocarbon ring residue or a heterocyclic ring residue.

The above-described dye-donative compound is usually used in an amount ranging from about $1\times10^{-4}$ to $1\times10^{-2}$ mol/m$^2$, and preferably from $2\times10^{-4}$ to $2\times10^{-3}$ mol/m$^2$.

When the present invention is applied to photographic layers according to silver salt diffusion transfer photography, a preferred embodiment of an image-receiving layer to be employed is a layer comprising a matrix permeable to an alkaline processing solution and a substance catalyzing reduction of a water-soluble silver complex, which is called silver precipitation materials or development nuclei.

The silver precipitation nucleus which can be used may be any of so far known substances, such as heavy metals, e.g., zinc, mercury, lead, cadmium, iron, chromium, nickel, tin, cobalt, copper, etc., noble metals, e.g., palladium, platinum, silver, gold, etc., and sulfides, selenides or tellurides of these metals. These silver precipitation nuclei can be obtained by reducing the corresponding metal ion to form a metal colloid dispersion or mixing a metal ion solution and a soluble sulfide, selenide or telluride solution to form a colloid dispersion of a water-insoluble metal sulfide, metal selenide or metal telluride.

For obtaining an image-receiving element providing favorable image tone, these silver precipitation nuclei are usually present in an image-receiving layer in an amount of from $10^{-10}$ to $10^{-5}$ g/cm$^2$, and preferably from $10^{-8}$ to $10^{-6}$ g/cm$^2$.

Examples of the matrix substance include hydrophilic binders, such as gelatin, polyvinyl alcohol, carboxymethyl cellulose, methyl cellulose, etc., with a matrix substance prepared by hydrolyzing an alkali-immermeable polymer to render it alkali-permeable being particularly preferred. Hydrolyzable polymers impermeable to alkalies include cellulose esters, e.g., cellulose triacetate, cellulose diacetate, cellulose propionate, cellulose acetate butyrate, etc., and polyvinyl esters, e.g., polyvinyl acetate, polyvinyl propionate, polyvinyl chloroacetate, etc. An alkali-impermeable polymer layer comprising at least one of these polymers is rendered alkali-permeable by hydrolysis with an alkaline solution. In addition, polyvinyl acetals, such as polyvinyl formal, polyvinyl acetal, polyvinyl butyral, etc., can also be used. In this case, these polymers are rendered alkali-permeable by acid-hydrolysis.

The hydrolysis of the alkali-impermeable polymer layer to make it alkali-permeable can be carried out by contacting the alkali-impermeable polymer layer, e.g., a cellulose ester, with a saponifying solution prepared by dissolving an alkali, e.g., sodium hydroxide, potassium hydroxide, lithium hydroxide, tetraalkylammonium hydroxide, etc., in a 10 to 90% by weight alcoholic aqueous solution of methanol, ethanol, etc. The contact can be carried out by any known techniques, such as brush coating, roller coating, air knife coating, spray coating, dip coating, and the like. The thus saponified alkali-impermeable polymer layer becomes permeable to a processing solution for diffusion transfer photography.

An image-receiving layer for silver salt diffusion transfer photography can be prepared by a process comprising incorporating a silver precipitation nucleus in a cellulose ester, e.g., cellulose diacetate, by deposition, coating the cellulose ester on a support, followed by alkali-hydrolysis; a process comprising reacting, for example, silver nitrate and sodium sulfide in a cellulose ester solution to form a silver precipitation nucleus in situ, coating the solution on a support, followed by alkali-hydrolysis; a process comprising coating a cellulose ester on a support and subjecting the cellulose ester layer to alkali-hydrolysis simultaneously subjecting the cellulose ester layer to alkali-hydrolysis thereby silver precipitation nuclei are filled in in said hydrolyzed layer; a process comprising alkali-hydrolyzing a cellulose ester layer to convert it to regenerated cellulose and reacting, for example, chloroauric acid and a reducing agent in the hydrolyzed layer to form a silver precipitation nucleus in situ; and the like.

The silver halide emulsion which can be used in the present invention is a hydrophilic colloidal dispersion of silver chloride, silver bromide, silver chlorobromide, silver iodobromide, silver chloroiodobromide or a mixture thereof.

The photographic emulsion may be spectrally sensitized to blue, green, red or infrared light of relatively long wavelengths with sensitizing dyes. Usable sensitizing dyes include cyanine dyes, merocyanine dyes, complex cyanine dyes, complex merocyanine dyes, holopolar cyanine dyes, styryl dyes, hemicyanine dyes, oxonol dyes, hemioxonol dyes, etc.

Examples of developing agents which can be used for development of exposed silver halides include hydroquinones, aminophenols, phenylenediamines and pyrazolidinones (e.g., 1-phenyl-3-pyrazolidinone, Dimezone 1-p-tolyl-4,4-dihydroxymethyl-3-pyrazolidinone, 1-p-tolyl-4-methyl-4-hydroxymethyl-3-pyrazolidinone, 1-(4′-methoxyphenyl)-4-methyl-4-hydroxymethyl-3-pyrazolidinone, 1-phenyl-4-methyl-4-hydroxymethyl-3-pyrazolidinone, etc.) as described in U.S. Pat. No. 4,336,322.

Of these developing agents, black-and-white developing agents having a property to lessen stain formation in an image-receiving layer as compared with color developing agents, such as phenylenediamines, and especially pyrazolidinones, are preferred.

A processing solution contains a base, e.g., sodium hydroxide, potassium hydroxide, sodium carbonate, sodium phosphate, etc., and has an alkalinity of at least pH 9, and preferably at least pH 11.5. The processing solution may contain various additives, such as an antioxidant, e.g., sodium sulfite, ascorbic acid salts, piperidinohexose reductone, etc.; a silver ion concentration controlling agent, e.g., potassium bromide, etc.; a viscosity increasing compound, e.g., hydroxyethyl cellulose, sodium carboxymethyl cellulose, etc.; a compound accelerating development or dye diffusion, e.g., benzyl alcohol, etc.; and the like. The processing solution can further contain a white pigment for forming a white reflecting layer of a transferred image, e.g., titanium dioxide, zinc oxide, etc.; or a black pigment, e.g., carbon black, or a compound which is black under an alkaline condition but becomes colorless upon reduction of the pH, so that development may be completed in a bright room.

It is preferable that the alkaline processing solution is placed in a container which is rupturable by application of pressure.

The present invention is now illustrated in greater detail with reference to the following examples, but it should be understood that the present invention is not limited thereto.

EXAMPLE 1

An image-receiving sheet having the following layer structure was prepared as a control sample.

Paper Support: Paper of 150 μm in thickness having laminated on a back side thereof a 30 μm thick polyethylene layer and on an image-receiving side thereof a 30 μm thick polyethylene layer having dispersed therein titanium dioxide in an amount of 10% by weight based on the weight of the polyethylene.

The back side of the paper support was coated with the following layers (a), (b) and (c) in the order listed:

(a) A light screening layer containing 4.0 $g/m^2$ of carbon black and 2.0 $g/m^2$ of gelatin.

(b) A white layer containing 8.0 $g/m^2$ of titanium dioxide and 1.0 $g/m^2$ of gelatin.

(c) A protective layer containing 0.6 $g/m^2$ of gelatin.

The image-receiving side of the paper support was coated with the following layers (1) to (5) in the order listed:

(1) A neutralizing layer containing 22 $g/m^2$ of an acrylic acid-butyl acrylate copolymer (8/2 molar ratio) having an average molecular weight of 50,000.

(2) A neutralization timing layer containing 4.5 $g/m^2$ of a mixture of cellulose acetate having an acetyl value of 51.3% (which means hydrolysis of a one gram sample yields 0.513 g of acetic acid) and a styrene-maleic anhydride copolymer (1/1 molar ratio) having an average molecular weight of about 10,000 at a mixing ratio of 95/5 by weight.

(3) A temperature-compensation neutralization timing layer containing 1.6 $g/m^2$, on a solid basis, of a mixture of a polymer latex obtained by emulsion polymerization of styrene, butyl acrylate, acrylic acid and N-methylolacrylamide at a weight ratio of 49.7/42.3/4 4 and a polymer latex obtained by emulsion polymerization of methyl methacrylate, acrylic acid and N-methylolacrylamide at a weight ratio of 93/3/4 at a mixing ratio of 6/4 (solids basis) and, as a coating aid, a compound of the formula

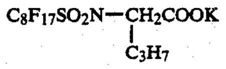

(4) An image-receiving layer containing 3.0 $g/m^2$ of a polymer of the following formula, 3.0 $g/m^2$ of gelatin, and, as a coating aid, a compound of the formula

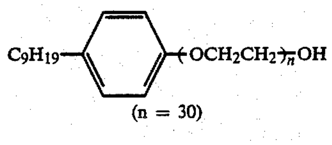

(n = 30)

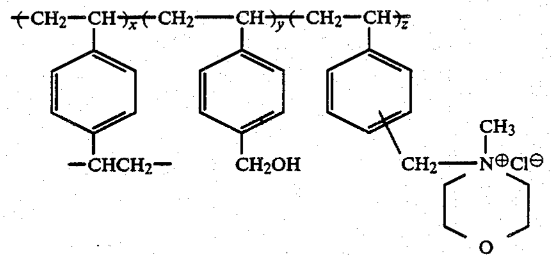

x:y:z = 5:5:90

(5) A protecting layer containing 0.6 $g/m^2$ of gelatin.

An image-receiving sheet according to the present invention was prepared in the same manner as for the control sample except for coating each of the polyisocyanates shown in Table 1 below between the neutralization timing layer and the temperature-compensation neutralization timing layer.

TABLE 1

| Sample No. | Polyisocyanate | Solution Coverage ($ml/m^2$) | Coating Method | Drying Temperature (°C.) | Solid Content ($g/m^2$) | Remark |
|---|---|---|---|---|---|---|
| 1 | Compound 3 | 7 | gravure | 80 | 0.08 | Invention |
| 2 | " | 14 | " | 80 | 0.08 | " |
| 3 | " | 14 | " | 40 | 0.08 | " |
| 4 | " | 35 | extrusion | 80 | 0.08 | Comparison |
| 5 | " | 35 | " | 40 | 0.06 | " |
| 6 | Compound 4 | 7 | gravure | 80 | 0.06 | Invention |
| 7 | " | 35 | extrusion | 80 | 0.06 | Comparison |
| 8 | Compound 6 | 7 | gravure | 80 | 0.06 | Invention |
| 9 | " | 35 | extrusion | 80 | 0.06 | Comparison |

A light-sensitive sheet was prepared by coating a polyethylene terephthalate transparent support with the following layers in the order listed:

Back side: (a) A light screening layer containing 4.0 $g/m^2$ of carbon black and 2.0 $g/m^2$ of gelatin.

Emulsion side:

(1) A layer containing 0.44 $g/m^2$ of a cyan dye-releasing redox compound of the following formula, 0.09 $g/m^2$ of tricyclohexyl phosphate, 0.008 $g/m^2$ of 2,5-di-t-pentadecylhydroquinone and 0.8 $g/m^2$ of gelatin:

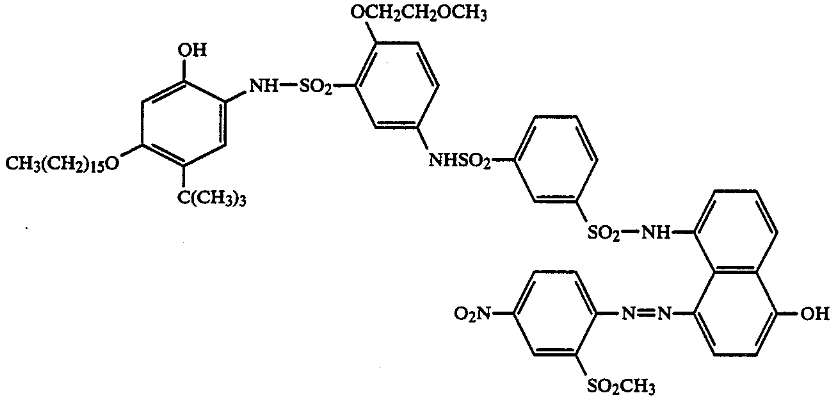

(2) A red-sensitive emulsion layer containing a red-sensitive inner latent image type direct positive silver bromide emulsion (silver content: 1.03 $g/m^2$; gelatin concontent: 1.2 $g/m^2$), 0.04 $mg/m^2$ of a nucleating agent of the following formula and 0.13 $g/m^2$ of sodium 2-sulfo-5-n-pentadecylhydroquinone:

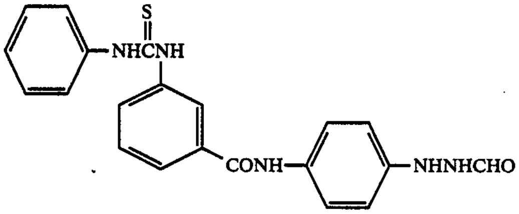

(3) A layer containing 0.43 $g/m^2$ of 2,5-di-t-pentadecylhydroquinone, 0.1 $g/m^2$ of trihexyl phosphate and 0.4 $g/m^2$ of gelatin.

(4) A layer containing 0.21 $g/m^2$ of a magenta dye-releasing redox compound of the formula I, 0.11 $g/m^2$ of a magenta dye-releasing redox compound of the formula II, 0.08 $g/m^2$ of tricyclohexyl phosphate, 0.009 $g/m^2$ of 2,5-di-t-pentadecylhydroquinone and 0.9 $g/m^2$ of gelatin:

Formula I

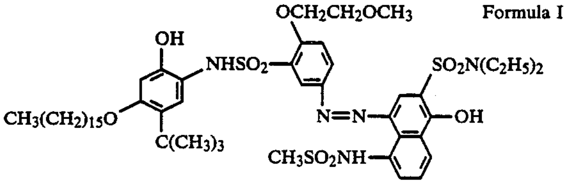

-continued

Formula II

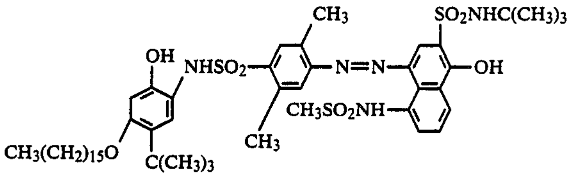

(5) A green-sensitive emulsion layer containing a green-sensitive inner latent image type direct positive silver bromide emulsion (silver content: 0.82 $g/m^2$; gelatin content: 0.9 $g/m^2$), 0.03 $mg/m^2$ of the same nucleating agent as used in Layer (2) and 0.08 $g/m^2$ of sodium 2-sulfo-5-n-pentadecylhydroquinone.

(6) The same layer as Layer (3).

(7) A layer containing 0.53 $g/m^2$ of a yellow dye-releasing redox compound of the following formula, 0.13 $g/m^2$ of tricyclohexyl phosphate, 0.014 $g/m^2$ of 2,5-di-t-pentadecylhydroquinone and 0.7 $g/m^2$ of gelatin:

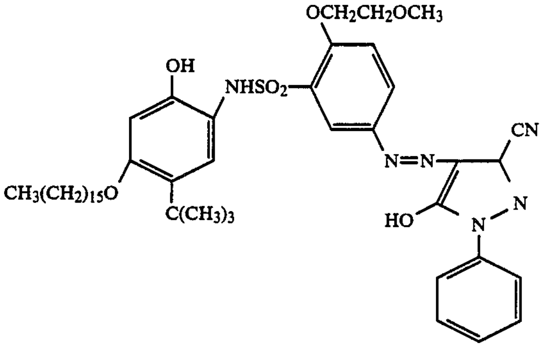

(8) A blue-sensitive emulsion layer containing a blue-sensitive inner latent image type direct positive silver bromide emulsion (silver content: 1.09 $g/m^2$; gelatin content: 1.1 $g/m^2$), 0.04 $mg/m^2$ of the same nucleating agent as in Layer (2) and 0.07 $g/m^2$ of sodium 2-sulfo-5-n-pentadecylhydroquinone.

(9) A layer containing 1.0 $g/m^2$ of gelatin.

The light-sensitive sheet was exposed to light through a color test chart and then brought into contact with each of the image-receiving sheets. A processing solution having the following formulation was spread between the light-sensitive sheet and the image-receiving sheet to a thickness of 65 μm with an aid of a pressure roll. The processing was conducted at 25° C. Ninety seconds later, the image-receiving sheet was stripped from the light-sensitive sheet.

Formulation of Processing Solution:
1-p-Tolyl-4-hydroxymethyl-4-methyl-3-pyrazolidone: 8.0 g,
Methylhydroquinone: 0.1 g,
5-Methylbenzotriazole: 5.0 g,
Anhydrous sodium sulfite: 2.0 g,
Hydroxyethyl cellulose: 40 g,
Potassium hydroxide: 56 g,
Benzyl alcohol: 2.0 g,
Water to make: 1 liter.

The area of the image-receiving sheet left on the light-sensitive sheet after the stripping was measured to evaluate the adhesive strength between layers constituting the image-receiving sheet. The smaller the area, the greater the adhesive strength.

The results obtained are shown in Table 2.

TABLE 2

| Sample No. | Area of Image-Receiving Layer Left on Light-Sensitive Sheet (%) | Remark |
|---|---|---|
| Control | 60 | Comparison |
| 1 | 0 | Invention |
| 2 | 1 | " |
| 3 | 2 | " |
| 4 | 5 | Comparison |
| 5 | 7 | " |
| 6 | 0 | Invention |
| 7 | 4 | Comparison |
| 8 | 0 | Invention |
| 9 | 6 | Comparison |

It can be seen from the above results that the adhesive strength between layers of the image-receiving sheet can be remarkably improved by coating a polyisocyanate solution and that this improving effect becomes greater as the solution coverage becomes smaller and as the drying temperature becomes higher.

EXAMPLE 2

In an image-receiving sheet, a neutralizing layer for neutralizing an alkaline processing solution is combined with a neutralization timing layer so that the neutralization may be effected after an elapse of a prescribed period of time from the spreading of a processing solution. This time period is called neutralization timing time and is taken as a parameter for neutralization behavior. The neutralization timing time is an important factor since too short or too long a timing time influences photographic performance, and can result in failure to obtain satisfactory images.

The neutralization timing time of each of the image-receiving sheets prepared in Example 1 was determined as follows.

A pH-indicator layer comprising 0.2 g/m$^2$ of Thymolphthalein and 7 g/m$^2$ of gelatin was coated on a polyethylene terephthalate transparent support. The image-receiving sheet was brought into contact with the pH-indicator-coated film in such a manner that the coated layers faced each other, and a processing solution having the following formulation was developed therebetween to a liquid thickness of 80 μm. The reflection density of the blue color of Thymolphthalein was measured from the side of the pH-indicator-coated film, and the time required for the reflection density to be reduced to one-half at 25° C. was taken as the neutralization timing time.

Formulation of Processing Solution:
Sodium carboxymethyl cellulose: 40 g,
Potassium hydroxide: 42 g,
Water: 918 g.

Further, the image-receiving sheet was processed in the same manner as described in Example 1, and the maximum density ($D_{max}$) and minimum density ($D_{min}$) of the resulting image were determined.

The results obtained are shown in Table 3 below.

TABLE 3

| Sample No. | Neutralization Timing Time (min) | $D_{max}$ B | $D_{max}$ G | $D_{max}$ R | $D_{min}$ B | $D_{min}$ G | $D_{min}$ R | Remark |
|---|---|---|---|---|---|---|---|---|
| Control | 3.1 | 2.37 | 2.50 | 2.84 | 0.11 | 0.11 | 0.18 | Comparison |
| 1 | 3.1 | 2.37 | 2.51 | 2.84 | 0.11 | 0.11 | 0.18 | Invention |
| 2 | 3.1 | 2.38 | 2.51 | 2.84 | 0.11 | 0.11 | 0.18 | " |
| 3 | 3.2 | 2.41 | 2.53 | 2.87 | 0.11 | 0.12 | 0.19 | " |
| 4 | 3.7 | 2.45 | 2.58 | 2.91 | 0.13 | 0.13 | 0.20 | Comparison |
| 5 | 3.9 | 2.47 | 2.59 | 2.94 | 0.14 | 0.13 | 0.21 | " |
| 6 | 3.1 | 2.38 | 2.50 | 2.84 | 0.11 | 0.11 | 0.18 | Invention |
| 7 | 3.8 | 2.46 | 2.59 | 2.92 | 0.14 | 0.13 | 0.20 | Comparison |
| 8 | 3.1 | 2.37 | 2.50 | 2.85 | 0.11 | 0.11 | 0.18 | Invention |
| 9 | 3.6 | 2.43 | 2.56 | 2.90 | 0.12 | 0.13 | 0.20 | Comparison |

As is shown in Table 3, Sample Nos. 4, 5, 7 and 9 wherein the solution coverage is larger suffer great variation in neutralization timing time and photographic performances as compared with Control Sample, while Sample Nos. 1 to 3, 6 and 8 having a smaller solution coverage substantially do not undergo such changes. Further, influences on neutralization timing and photographic performances are lessened with the higher drying temperature.

Thus, the present invention makes it possible to improve adhesion between photographic layers without adversely affecting photographic properties.

EXAMPLE 3

An image-receiving sheet was prepared in the same manner as for Control Image-Receiving Sheet in Example 1 except for forming a polyisocyanate layer between the neutralizing layer and the neutralization timing layer as shown in Table 4 below.

11. A photographic element comprising a support having provided thereon at least (1) a first dry photographic layer comprising a high molecular weight compound having a functional group capable of reacting with an isocyanate group and (2) a second photographic layer comprising a high molecular weight compound having a functional group capable of reacting with a isocyanate group which compound is different from the high molecular weight compound of said first layer, wherein said photographic element further comprises between said first dry photographic layer and said second photographic layer a layer produced by coating from 2 to 20 ml/$m^2$ of a solution containing a polyisocyanate compound having at least two isocyanate groups, and drying said solution.

* * * * *

TABLE 4

| Sample No. | Polyiso-cyanate | Solution Coverage (ml/m²) | Coating Method | Drying Temperature (°C.) | Solid Content (g/m²) | Remark |
|---|---|---|---|---|---|---|
| 10 | Compound 3 | 7 | gravure | 80 | 0.02 | Invention |
| 11 | " | 7 | " | 80 | 0.04 | Invention |
| 12 | " | 35 | extrusion | 80 | 0.02 | Comparison |
| 13 | " | 35 | " | 80 | 0.04 | " |

Each of Control Sample and the resulting image-receiving sheets was processed in the same manner as in Example 1. The processed image-receiving sheet was left to stand at 25° C. and 50% RH for 24 hours to completely dry. The sample was then fixed in a dish with the image-receiving layer upside, and distilled water at 25° C. was poured therein to a height of about 5 mm from the image-receiving layer. After 1 minute immersion, the surface of the image-receiving layer was scratched with a sapphire stylus having a diameter of 0.2 mm over a length of 10 cm at a speed of 10 cm/sec., while continuously changing the load applied to the stylus on the layer from 100 g to 200 g. That is, the stylus moved on the image-receiving layer with an increasing load. The length of the image-receiving layer which was scraped off with the moving stylus was measured, and the results obtained are shown in Table 5. Shorter lengths indicate higher adhesive strengths between layers.

TABLE 5

| Sample No. | Length Scraped (cm) | Remark |
|---|---|---|
| Control | 8.0 | Comparison |
| 10 | 0.5 | Invention |
| 11 | 0 | " |
| 12 | 1.0 | Comparison |
| 13 | 0.6 | " |

As is apparent from the results of Table 5, the scraped length is shorter, i.e., adhesion between layers is higher when the solution coverage is smaller even with the solid content coverage been equal. These results prove that the polyisocyanate acts on only the interface between layers while being suppressed from penetration into the lower layer by reducing the amount of the solvent.

Thus, according to the present invention, adhesion between photographic layers in dry or wet state can be strengthened by a simple and easy process of coating a prescribed amount of a polyisocyanate therebetween without adversely affecting photographic performances of these layers to thereby prevent layer separation.

Moreover, Compound Nos. 3 and 4 of the polyisocyanates which can be used in the present invention are advantageous in view of coating step and cost involved because of their availability as commercial products under the trademarks of Coronate HL and Millionate MT (both manufactured by Nippon Polyurethane Industry Co., Ltd.), respectively, their low cost, relatively simple structure, and good solubility in organic solvents.

While the invention has been described in detail and with reference to specific embodiments thereof, it will be apparent to one skilled in the art that various changes and modifications can be made therein without departing from the spirit and scope thereof.

What is claimed is:

1. A process for improving adhesion between photographic layers of a photographic element comprising a support having provided thereon at least (1) a first dry photographic layer comprising a high molecular weight compound having a functional group capable of reacting with an isocyanate group and (2) a second photographic layer comprising a high molecular weight compound having a functional group capable of reacting with an isocyanate group which compound is different from the high molecular weight compound of said first layer, which process comprises coating from 2 to 20 ml/m² of a solution containing a polyisocyanate compound having at least two isocyanate groups on the first dry photographic layer, drying said solution, and then coating the second photographic layer.

2. A process as in claim 1, wherein said first dry photographic layer is a neutralization layer and said second photographic layer is a neutralization timing layer.

3. A process as in claim 1, wherein said first dry photographic layer is a first neutralization timing layer and said second photographic layer is a second neutralization timing layer.

4. A process as in claim 1, wherein said first dry photographic layer is a neutralization layer and said second photographic layer is an image-receiving layer.

5. A process as in claim 1, wherein the coated amount of said polyisocyanate compound is in the range of from 0.001 to 1.0 g/m².

6. A process as in claim 5, wherein the coated amount of said polyisocyanate compound is in the range of from 0.01 to 0.4 g/m².

7. A process as in claim 1, wherein said solution containing a polyisocyanate compound further comprises at least one of a tertiary amine and a metal salt capable of accelerating reaction of isocyanate groups of the polyisocyanate, in an amount of from about 0.1 to 7 mol% based on the amount of polyisocyanate.

8. A process as in claim 7, wherein said tertiary amine is selected from the group consisting of triethylamine, diazabicyclooctane, triethanolamine, and N-methylmorpholine, and said metal salt is selected from the group consisting of dibutyltin laurate, cobalt octenoate, lead octenoate, tin octenoate, and zinc octenoate.

9. A process as in claim 6, wherein said solution containing a polyisocyanate compound further comprises at least one of a tertiary amine and a metal salt capable of accelerating reaction of isocyanate groups of the polyisocyanate, in an amount of from about 0.1 to 7 mol% based on the amount of polyisocyanate.

10. A process as in claim 9, wherein said tertiary amine is selected from the group consisting of triethylamine, diazabicyclooctane, triethanolamine, and N-methylmorpholine, and said metal salt is selected from the group consisting of dibutyltin laurate, cobalt octenoate, lead octenoate, tin octenoate, and zinc octenoate.